E. A. GOLLE.
AIR COMPRESSOR.
APPLICATION FILED JULY 3, 1919.

1,370,305.

Patented Mar. 1, 1921.
3 SHEETS—SHEET 1.

WITNESSES
H. T. Walker
P. H. Pattison

INVENTOR
E. A. GOLLE
BY
ATTORNEYS

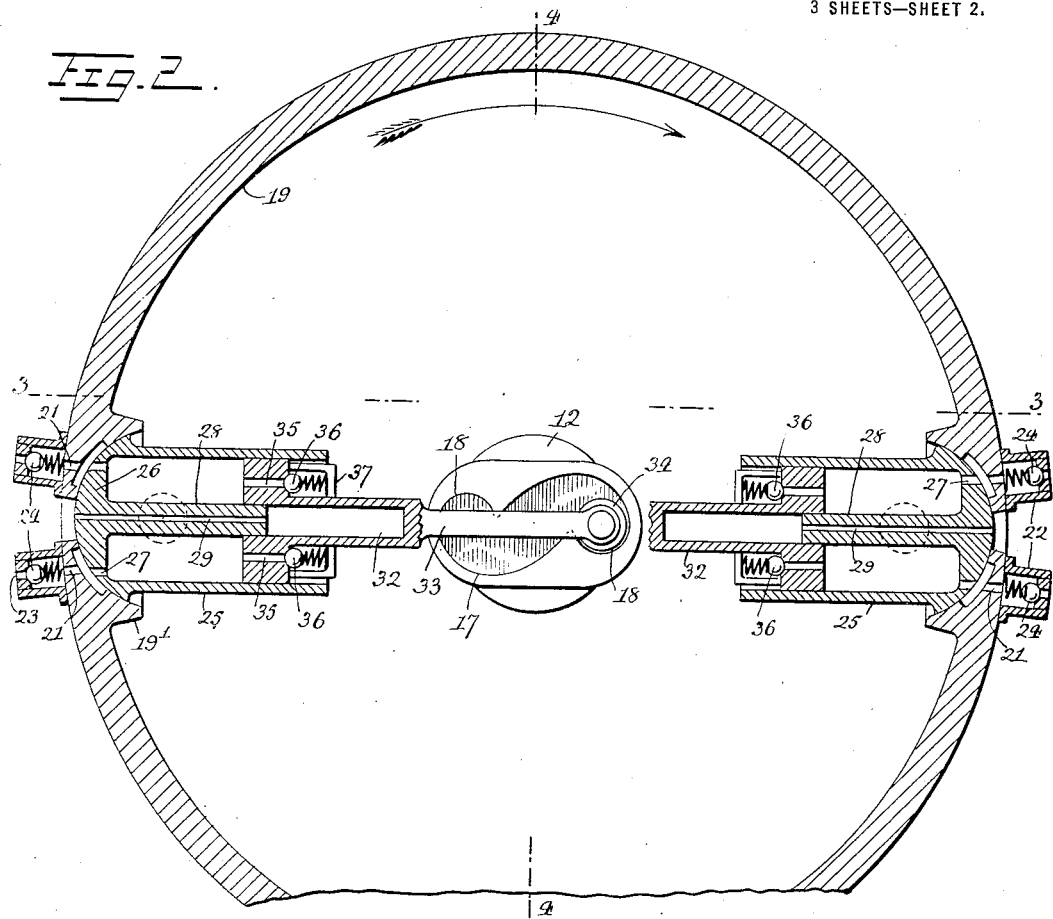
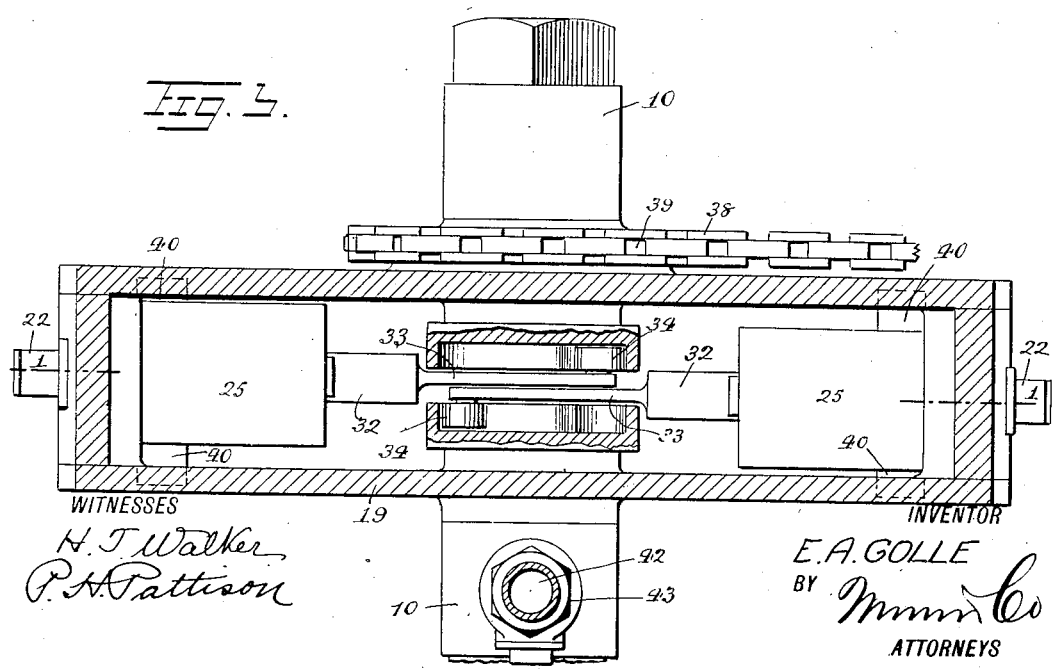

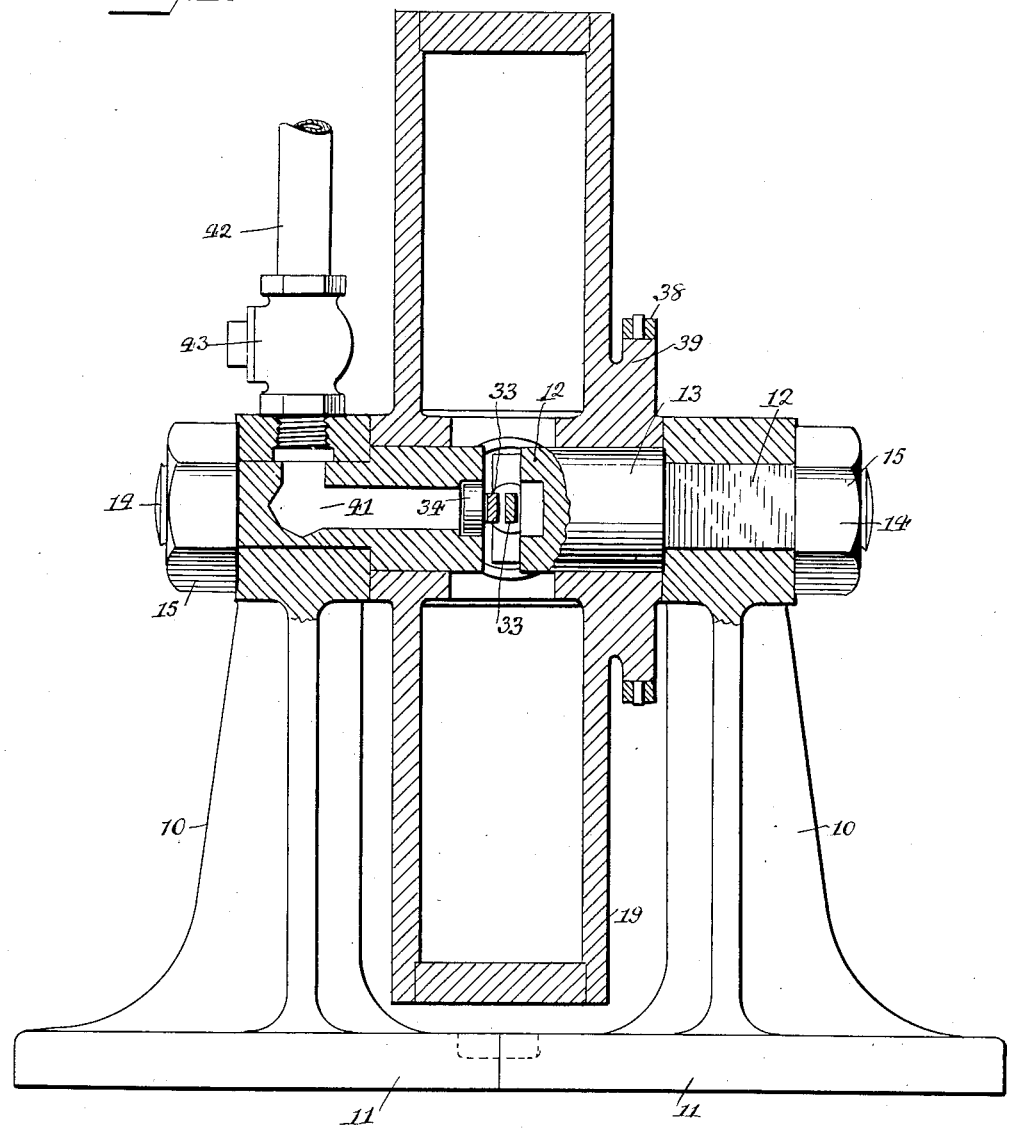

UNITED STATES PATENT OFFICE.

EDWIN A. GOLLE, OF GRAND BEACH, MICHIGAN.

AIR-COMPRESSOR.

1,370,305.  Specification of Letters Patent.  Patented Mar. 1, 1921.

Application filed July 3, 1919. Serial No. 308,641.

*To all whom it may concern:*

Be it known that I, EDWIN A. GOLLE, a citizen of the United States, and a resident of Grand Beach, in the county of Berrien and State of Michigan, have invented a new and Improved Air-Compressor, of which the following is a full, clear, and exact description.

The present invention relates to new and useful improvements in air compressors, and pertains more particularly to compressors of the rotary type.

The primary object of the invention is to provide a device in which air may be compressed with greater efficiency than is capable of machines at present in use.

A further object of the invention is to provide a device of this character which is simple in both construction and operation.

Referring to the drawings—

Fig. 2 is a similar view with the parts in another position;

Fig. 3 is a sectional view on the line 3—3 of Fig. 2;

Fig. 4 is a sectional view on the line 4—4 of Fig. 2.

Figure 1:
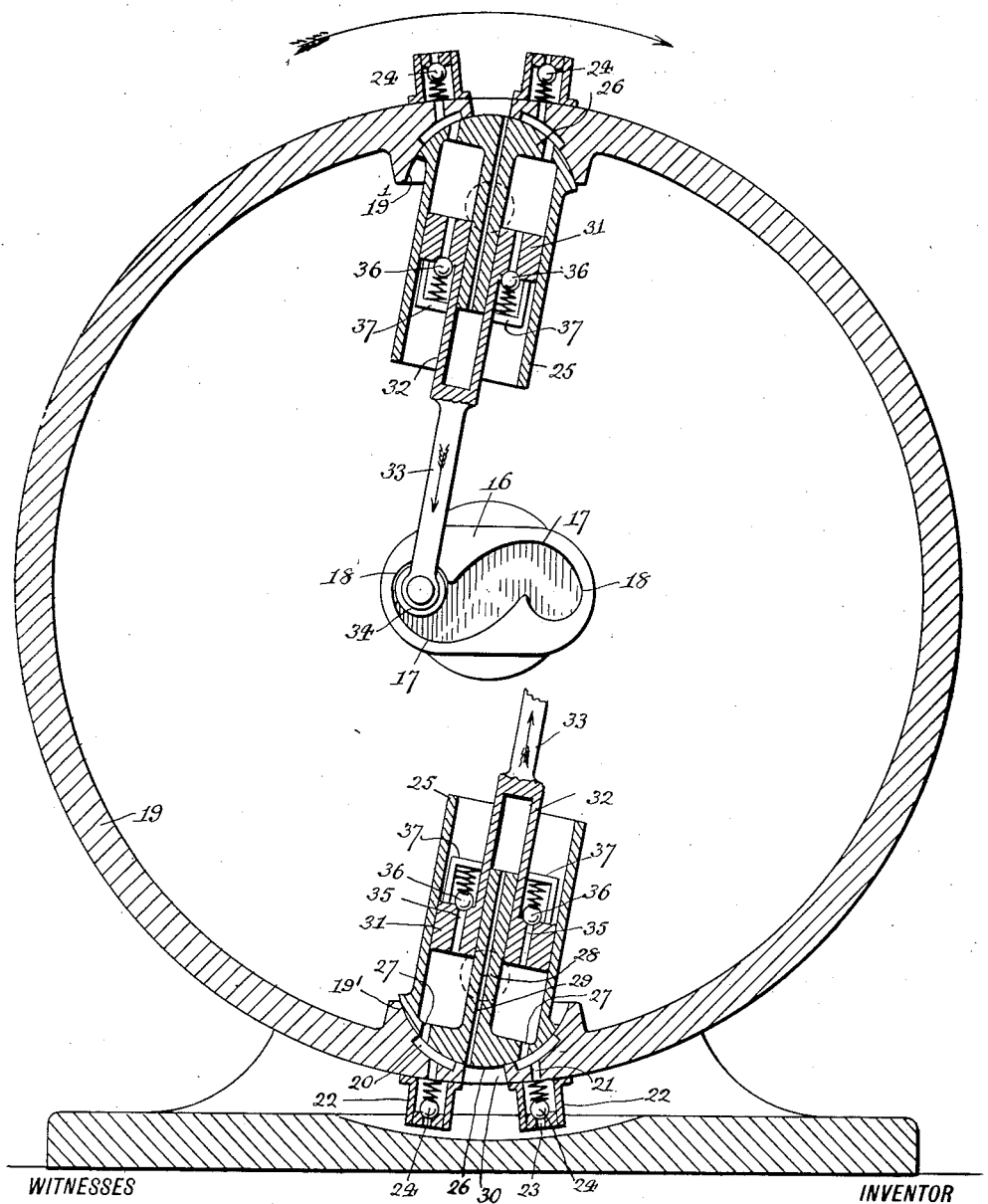
Figure 1 is a vertical sectional view of the device with the several parts in one position, and taken on the line 1—1 of Fig. 3.

Referring more particularly to the drawings, the device comprises a pair of spaced brackets 10, each of which is provided with a suitable base 11. Mounted in each of the brackets 10 is a stub shaft 12, and each of said stub shafts 12 is provided with an enlarged inner portion 13, which is machined to form a true bearing surface, the purpose of which will be hereinafter described. Each of the reduced portions of the stub shafts is screw-threaded, as at 14, and threaded thereon are nuts 15 which nuts serve to secure the stub shafts in place. These stub shafts are also squared to prevent rotary movement in the brackets 10.

The stub shafts 12 are each provided on its inner end with a cam member 16, the specific construction of which is best set forth in Figs. 1 and 2. Each of these cam members 16 includes a slot, which is formed with two long curved surfaces 17, which terminate in short curved surfaces 18.

Rotatably mounted on the bearings 13 of the stub shafts 12, is a hollow casing 19, which is circular in form and provided at two diametrically opposite points with curved seats 19'. These curved seats 19' are each provided with two air chambers 20, and leading from each of said air chambers 20, through the wall of the casing 19, are air passages 21. Surrounding each of these passages 21, are cages 22, each of which is provided with an air inlet 23 controlled by the spring-pressed valves 24.

The reference character 25 designates cylinders, and the outer end of each of said cylinders is curved as at 26, to conform to the curvature of the seats 19', and said cylinders are provided with two air intake passages 27, which are adapted to communicate with the chambers 20. Projecting inwardly of each cylinder is a guide 28, and said guides are each provided with a longitudinal passage 29, which passages extend through the heads of the pistons and communicate with the exterior of the casing 19 by means of the passage 30.

Slidably mounted in each of the cylinders 25, is a piston 31, and these pistons 31 are each provided with a tubular extension 32, which receives its respective tubular guide 28. Projecting from the inner end of each of the tubular members 32, is a piston rod 33, and each of said piston rods is provided on its inner end with an antifriction roller 34, which is adapted to travel in its respective cam slot in its cam member 16. The piston heads 31 are each provided with passages 35, each of which is controlled by a spring-pressed valve 36, which is supported in place by means of brackets or cages 37.

The device operates in the following manner:

The casing 19 is rotated by means of a driving chain 38, which passes around a sprocket 39 carried by the casing 19. As the casing rotates, the pistons 31 are moved inwardly of their cylinders, and air is drawn in through the passages 23 to the interior of the cylinders 25. As the cylinders assume a position in alinement with the cam slots, as shown in Fig. 2, the pressure on the interior of the casing 19, forces the pistons 31 to the outer ends of the cylinders, the air passing through the passages 35 to the interior of said casing. This action takes place twice during each rotation of the casing 19, and as the pistons move outwardly of their respective cylinders, the anti-friction rollers are moved to the opposite end of their respective cam slots. Each of the cylinders 25 is pivotally mounted in the casing as at 40, said cylinders being free to rock about their pivotal point with their curved outer ends in contact with the curved seats 19'.

Leading through one of the stub shafts 12 is a passage 41, which communicates the interior of the casing 19 with a pipe 42, which in turn connects with a suitable reservoir, not shown, and the passage through this pipe is controlled by means of a check valve 43.

Having thus described the invention, what is claimed is:

An air compressor comprising a rotating cylinder, a hollow shaft for supporting said cylinder, a plurality of air actuated valves mounted exteriorly of the cylinder at diametrically opposite points and in communication with the interior of the cylinder, curved seats formed on the interior of said cylinder, cylinders adapted for oscillating movement and pivotally carried by the interior of the first-mentioned cylinder, said cylinders having curved ends provided with air passages adapted to establish communication between the interior of the internal cylinders and the exterior of the rotating cylinder, a piston mounted in each of the internal cylinders, and means for reciprocating said pistons.

EDWIN A. GOLLE.